W. Payton.
Water-Meter.
Nº 73194.    Patented Jan. 7, 1868.
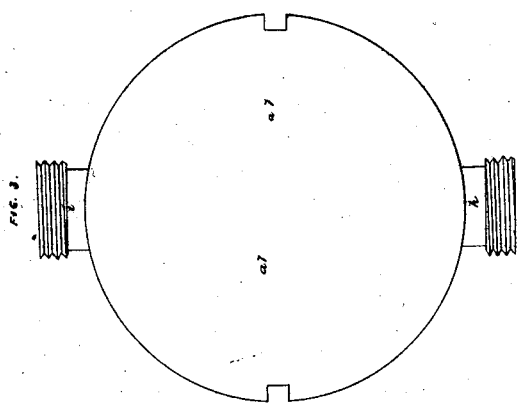
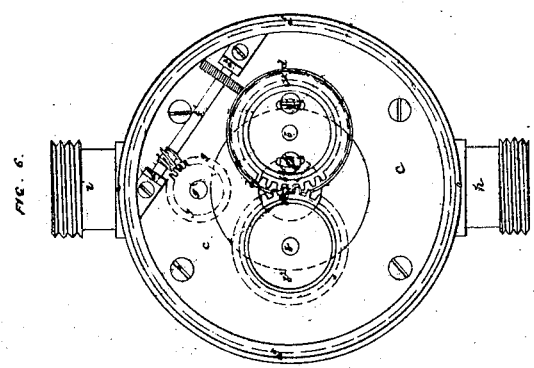
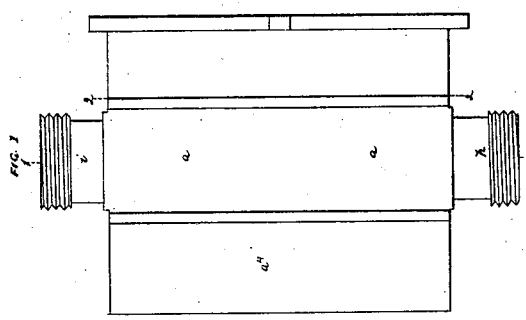
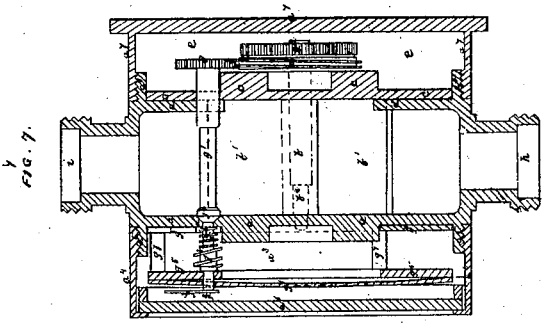
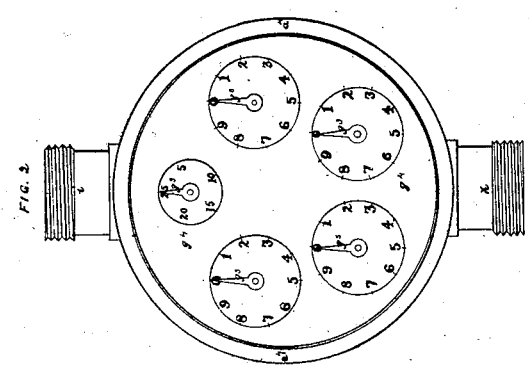
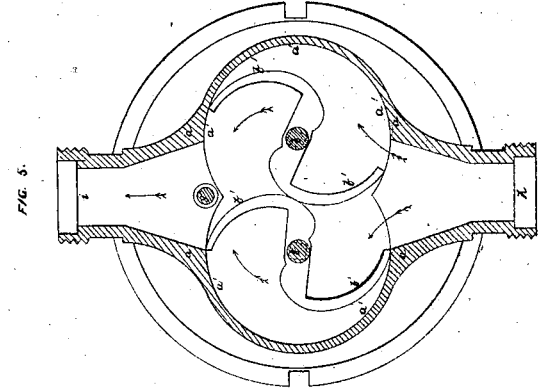
Witnesses.
Inventor.
Walter Payton.

Sheet.2. 4.Sheets.

W. Payton.
Water-Meter.

№ 73194

Patented Jan. 7, 1868.

Witnesses.

Inventor.
Walden Payton

Sheet 3. 4 Sheets.

W. Payton.
Water-Meter.

No 73,194.  Patented Jan. 7, 1868.

Witnesses.
Inventor.
Walter Payton.

Sheet 2 4 Sheets.
W. Payton.
Water-Meter.
Nº 73,194  Patented Jan. 7, 1868.
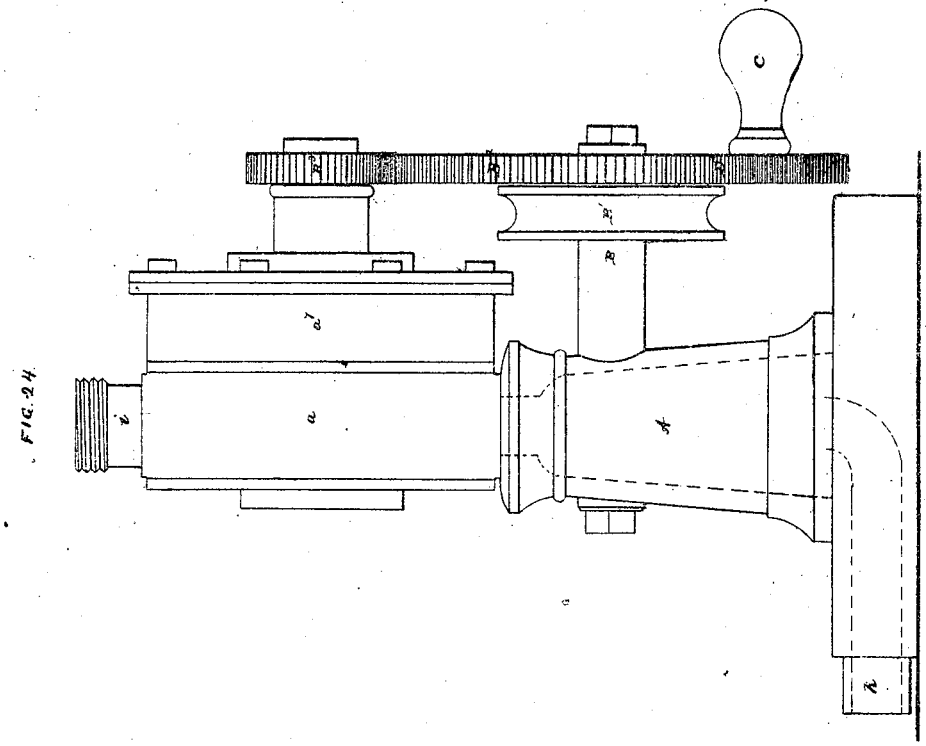
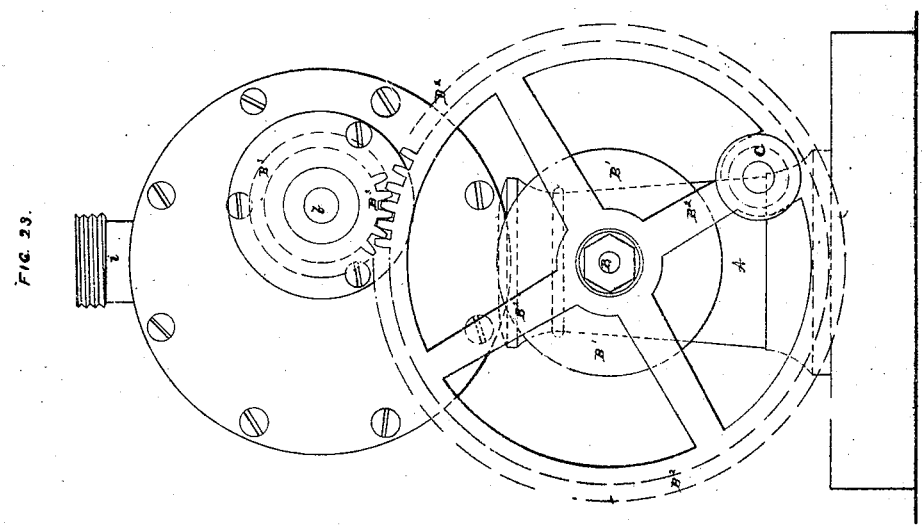
Witnesses.
Inventor.
Walter Payton.

United States Patent Office.

WALTER PAYTON, OF SEWARDSTONE ROAD, VICTORIA PARK, ENGLAND.

Letters Patent No. 73,194, dated January 7, 1868.

IMPROVEMENT IN WATER-METERS.

*The Schedule referred to in these Letters Patent and making part of the same.*

TO ALL TO WHOM IT MAY CONCERN:

Be it known that I, WALTER PAYTON, of Sewardstone Road, Victoria Park, in the county of Middlesex, England, have invented "Improvements in Means or Apparatus for Measuring the Passage or Flow of Liquids, which improvements are also applicable to the raising and forcing of fluids, and to the obtaining of motive-power;" and I do hereby declare that the following is a full and exact description thereof, reference being had to the accompanying drawings, and to the letters of reference marked thereon.

My improvements relate to means or apparatus for measuring the passage or flow of liquids, and are also applicable to raising or forcing fluids, and to obtaining motive-power.

But that the invention may be fully understood, I will, by the aid of the accompanying drawings, proceed to describe the means pursued by me in carrying the same into effect.

In carrying out my invention, I apply axes within a chamber formed of parts of two cylinders, one axis being applied to the centre of one part cylinder, and another axis to the centre of the other part cylinder. Upon each of these axes I apply vanes, extending from near the axis to the periphery of its part cylinder. These vanes, in place of being radial, are of a curved form, the curve gradually progressing from near the centre to the outer extremity, and is such that the vanes of one axis may work in between those of the other, and yet maintain continuous proximity, one with that of the other, whilst other of the vanes are, at their outer edges, in or nearly in contact with their respective interior cylindrical surfaces of the case. The ends of such vanes move freely, though in or nearly in contact with the case. The axes are geared together. Water or other liquid acting on these vanes, will cause their rotation, by which a motion-power engine is obtained, and each rotation of them will form a measured quantity, which may be indicated by index-apparatus applied to one of the axes. By giving motion to the axes to cause the rotation of the vanes, a gas-exhauster, a pump, or apparatus for raising and forcing fluids, is obtained. In these cases a foot-valve or valves may be used.

Figure 1 shows an external edge view,

Figure 2 an external front view,

Figure 3 a back view, and

Figure 4 a plan of apparatus for the purpose of measuring the passage or flow of water or other liquid.

Figure 5 is a section through the lines 1 1, fig. 1.

Figure 6 is a section through the lines 2 2, fig. 1.

Figure 7 is a general transverse section of the apparatus; and

Figure 15:
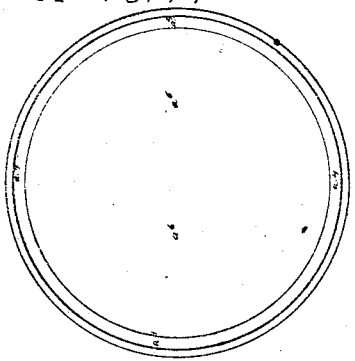
Figure 14:
Figure 13:
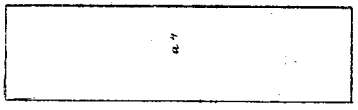
Figure 12:
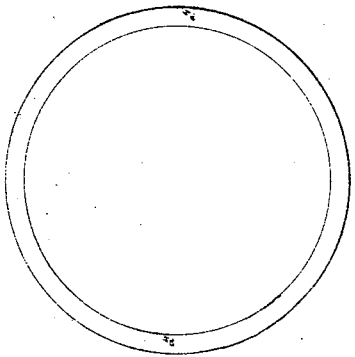
Figure 20:
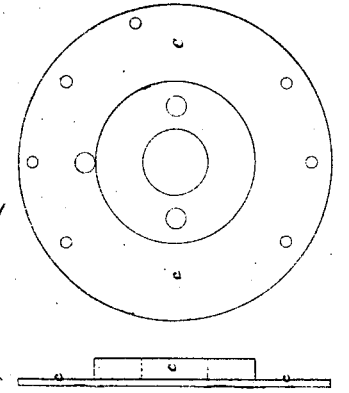
Figure 11:
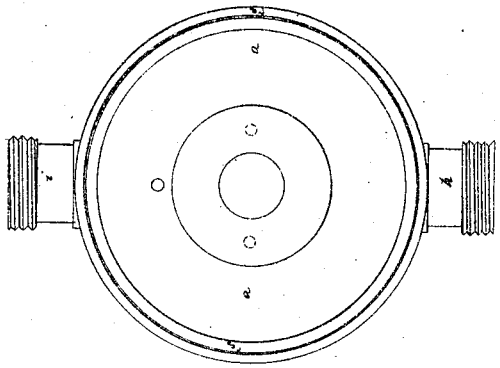
Figure 10:
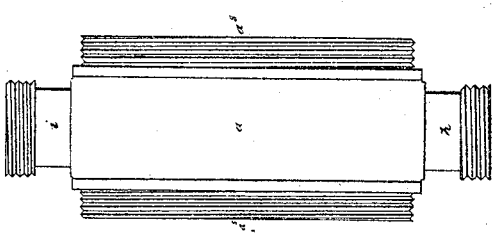
Figure 9:
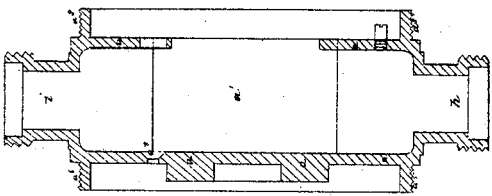
Figure 8:
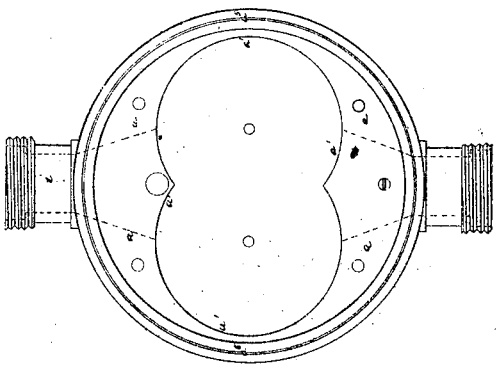
Figure 19:
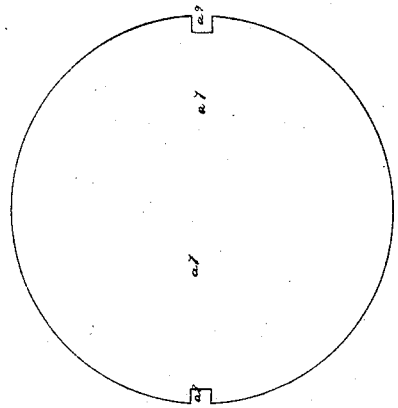
Figure 18:
Figure 17:
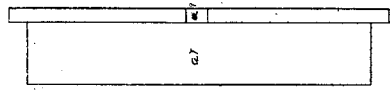
Figure 16:
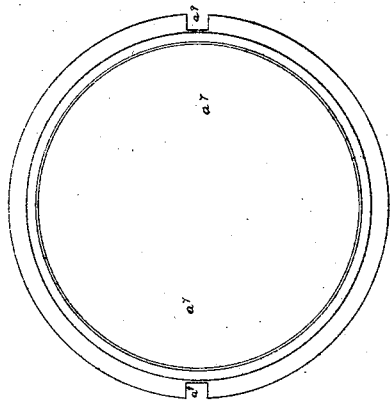
Figure 22:
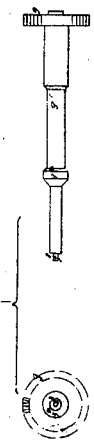
Figure 20:
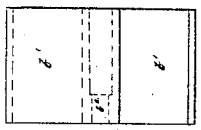
Figure 21:
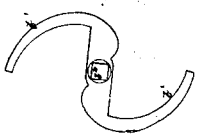
Figure 4:
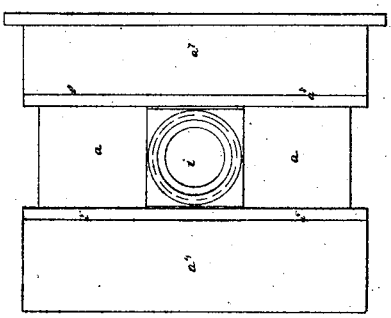

Figures 8, 9, 10, 11, 12, 13, 14, 15, 16, 17, 18, 19, 20, 21, and 22, show parts separately.

In each of these views the same letters indicate corresponding parts wherever they occur.

$a$ $a$ indicate the main casing, in which is formed the chamber composed of two part cylinders, $a^1$ $a^1$, to receive the axes $b$ $b$, and their vanes $b^1$ $b^1$. One end of each of the axes $b$ is supported in a recess formed for it in the casing $a$, whilst the other end of each of these axes is supported by passing through a hole formed for it in the plate $c$, which also serves at that part to enclose the chamber $a^1$, and form a plane surface for the ends of the vanes $b^1$ to work against. These vanes $b^1$, it will be seen, in place of being radial, are of a curved form, the curve of each gradually progressing from near the centre or axis $b$ of each, as indicated, to the outer extremity thereof, where it moves against the surface of its chamber $a^1$, such that the vanes $b^1$ of one axis work in between those of the other, and so that the vanes of one axis, as they approach those of the other, maintain continuous proximity. The axes $b$ are formed square at $b^*$, and fit into correspondingly-formed portions of the vanes $b^1$, thereby retaining the vanes $b^1$ in correct relation. Upon each of the axes $b$ is affixed a toothed wheel, $b^2$, and the teeth of one of these toothed wheels work into those of the other. One of these wheels, $b^2$, is capable of slight adjustment, to admit of adjustment of the vanes of one axis to those of the other. Upon one of the axes $b$, in the chamber $e$, is also affixed a worm-wheel, $d$, which takes into and drives the tooth-wheel $f$, affixed on the axis $f^1$, which turns in bearings $a^2$, and has applied to it the worm-wheel $f^2$, the teeth of which take into the teeth of a wheel, $g$. This wheel $g$ is affixed upon an axis, $g^1$, which passes through the casing $a$ to the index-chamber $a^3$, where it receives a pinion or worm, $g^2$, to give motion to a series of wheel-work, in connection with the hands $g^3$ $g^3$, thereby indicating on the dial $g^4$ the number of revolutions obtained to the vanes $b^1$ $b^1$, by the pressure of the liquid passing through the apparatus, and consequently the quantity of such fluid so passed.

The bearings for the axes of the series of wheel-work forming the index-apparatus are constructed in the circular plates $g^5$ $g^5$, which are connected together by the projections $g^7$ $g^7$. The dial $g^4$ is soldered or otherwise connected to one of the plates $g^5$, as indicated.

In place of employing ordinary packing in a stuffing-box, to prevent the passage of liquid from the chambers $a^1$ $a^1$ to the index-chamber $a^3$, the axis $g^1$ is formed conically at $g*$, to fit into a corresponding conically-formed recess, $a*$, adapted to receive it in the casing $a$, by which the friction and liability to leakage of ordinary packing are avoided. The conically-formed part $g*$ of the axis $g^1$ is retained in position in its recess $a*$ by means of the spring $g^6$. The axis $g^1$ is formed with a screw-thread at $g^8$, fitting a corresponding screw in its hand or indicator $g^3$, in order that that hand may be removed and allow of the index-apparatus and the axis $g^1$ being also removed if necessary. $h$ is the inlet-passage for the fluid. $i$ is the outlet-passage thereof. $a^4$ is a cap screwed on to the part $a$ at $a^5$, to form the index-chamber $a^3$, the end $a^6$ of which is formed of glass, in order that the index-apparatus may be observed. $a^7$ is another cap, which is screwed on the part $a$ at $a^8$, thereby forming the chamber $e$. $a^9$ $a^9$ are notches or recesses to receive a spanner or other instrument, to facilitate the tightening up of the parts of the case at $a^8$.

By applying suitable gear or a pulley, to receive a strap or band to an axis driven by one of the axes $b$, then an engine, constructed as described, may be converted into a motive-power engine, the power exerted depending upon the height or pressure of the column of liquid acting on the vanes $b^1$, considered in relation to the size of those vanes.

Apparatus thus arranged is shown at Figures 23 and 24. In this modification the index-chamber is dispensed with, and the apparatus is supported upon a hollow pedestal, A, and is provided with a pulley, $B^1$, fixed on the shaft B, which has affixed on it the pinion $B^2$, which takes into another pinion, $B^3$, affixed to one of the axes $b$ carrying the vanes $b^1$. By causing liquid under pressure to pass through the apparatus, the vanes $b$ will be caused to revolve, thereby giving motion, by means of the pinions $B^2$ $B^3$, to the pulley B, upon which may be applied a strap or band, in connection with the machinery required to be driven.

By giving motion to the axes $b$ $b$ by means of the pulley $B^1$, or a handle, C, and affixing a pipe to the inlet-passage $h$ dipping into a well or other reservoir, an engine so constructed may be converted into a pump or instrument for raising or forcing fluids, or it may be used as a gas-exhauster.

In using the apparatus as a pump, a suitable valve must be applied to the inlet-pipe to retain the water or liquid when raised.

Having thus described my invention, and means which I adopt in carrying the same into effect—

I claim the combination of the axes $b$ $b$, vanes $b^1$ $b^1$, gear-wheels $b^2$ $b^2$, worm $d$, gear-wheel $f$, worm $f^2$, gear $g$, shaft $g^1$, worm $g^2$, and gearing for the operation of the indicators $g^3$, chambers $e$, $a^3$, and $a^1$, all arranged as described, for the purpose of measuring the passage or flow of liquids, or for raising and forcing fluids, or for obtaining motive-power, substantially as herein shown and described.

In testimony whereof, I have signed my name to this specification in the presence of two subscribing witnesses.

WALTER PAYTON.

Witnesses:
ALFRED DONNISON,
JAMES E. NAYLOR, *his Clerk*.